(12) United States Patent
Dunham

(10) Patent No.: US 7,231,211 B2
(45) Date of Patent: Jun. 12, 2007

(54) APPARATUS AND METHOD FOR MONITORING A TRUNKED RADIO COMMUNICATIONS SYSTEM

(75) Inventor: Sam Dunham, San Jose, CA (US)

(73) Assignee: Signal Intelligence, Inc., San Jose, CA (US)

( * ) Notice: Subject to any disclaimer, the term of this patent is extended or adjusted under 35 U.S.C. 154(b) by 1027 days.

(21) Appl. No.: 10/205,422

(22) Filed: Jul. 24, 2002

(65) Prior Publication Data

US 2004/0018832 A1     Jan. 29, 2004

(51) Int. Cl.
*H04Q 7/20*     (2006.01)
(52) U.S. Cl. .............. 455/426.1; 455/520; 455/553.1; 455/518; 370/327; 370/340; 379/26.01; 379/12; 379/112.08; 379/232; 379/235; 379/236; 379/246
(58) Field of Classification Search ............. 455/426.1, 455/520, 553.1, 518; 370/327, 340; 379/12, 379/112, 97, 232, 235, 236, 249, 246, 26, 379/1

See application file for complete search history.

(56) References Cited

U.S. PATENT DOCUMENTS

| | | | | |
|---|---|---|---|---|
| 5,506,837 A | * | 4/1996 | Sollner et al. | 370/296 |
| 5,586,119 A | * | 12/1996 | Scribano et al. | 370/350 |
| 5,710,978 A | * | 1/1998 | Swift | 455/67.11 |
| 6,519,472 B1 | * | 2/2003 | Brennan et al. | 455/518 |

* cited by examiner

*Primary Examiner*—Matthew Anderson
*Assistant Examiner*—Shaima Q. Aminzay
(74) *Attorney, Agent, or Firm*—Rubinstein Law Group, P.C.; David Dort

(57) ABSTRACT

The present invention provides a method and apparatus for monitoring a trunked radio communications system by using some type of radio scanning receiver that is not designed for that purpose. In addition, the invention provides a method for automatically determining the polarity of the received control channel data. Further, the invention provides a method for automatically determining the type of trunked radio communications system. In addition the invention provides a method for automatically determining the channels in a trunked radio system and a method for automatically determining the bit rate of transmitted digital signals over a control channel of a trunked radio communications system.

25 Claims, 11 Drawing Sheets

MOTOROLA OSW MESSAGE FORMAT

EDACS OSW MESSSAGE FORMAT

APPARATUS AND METHOD FOR MONITORING A TRUNKED RADIO COMMUNICATIONS SYSTEM

BACKGROUND OF THE INVENTION

1. Field of the Invention

The invention relates generally to the field of radio systems, and more specifically to methods and apparatus for monitoring trunked radio communications, decoding the digital data from trunked radio control channels, and to methods and apparatus for determining the type of trunked radio system by observing the characteristics of the digital data transmitted on a control channel.

2. Description of the Related Art

Modernly, the two types of mobile radio communication systems. The first is a conventional radio communication system. Here, mobile radio units are assigned a single radio frequency channel. All subscribers to the system share the same channel, and cooperate by monitoring the channel for activity. Most conventional radio communication systems work well when there is a small number of subscribers and the usage patterns for all the subscribers is similar.

To overcome the limitations of the conventional radio communications system, an implementation of a trunked communications system is employed. In the trunked communication system, a central controller allocates a number of channels among many subscribers. Generally, the subscribers are organized into fleets, sub-fleets or groups, and individuals. Accordingly, each subscriber has a fleet, group, and an individual identification code. A mobile radio initiates communications by transmitting a digital request message to a system central controller via a predetermined inbound frequency. Here, the mobile unit generates a channel request that includes the necessary information to identify it to the central controller. The central controller responds to the mobile unit with a digital message via a separate and distinct predetermined outbound frequency that, in turn, authorizes the mobile unit to operate on an n another channel. This outbound digital message is often referred to as an outbound signaling word (OSW) or a channel assignment message or a channel grant message. Both the inbound and outbound channel is often referred to as a "system control channel". In addition, the mobile unit also responds to other commands that are received from the central controller.

There are a number of trunked radio systems that are currently use in the United States. One of these trunked radio systems is described in U.S. Pat. Nos. 4,692,945 and 4,723,264 issued to Motorola. These two patents disclose an improved dispatch trunked radio system having an expanded unifying signaling protocol used to implement several enhanced system features. Here, the subscriber or mobile units are capable of generating and receiving signaling information in a single word or concatenated in a dual-word signaling scheme. The central control unit is able to decode and generate signaling information in either a single or concatenated dual-word signaling scheme, as well as generates channel controlling information in accordance with either signaling scheme.

In addition, U.S. Pat. Nos. 4,055,832 and 4,312,070 also issued to Motorola describes the method used to encoding data transmitted over the control channel of a trunked radio system implemented by Motorola. Here, En and Coombes, et al. discloses an encoding and decoding system suited for use in a mobile trunked dispatch communication system capable of error correction, error detection, and detection of loss of synchronization. More specifically, the system disclosed in En and Coombes, et al., respectfully, provides an error correction system that can correct one random error out of every four bits transmitted with a minimum of time delay in transmission and a minimum number of components for system implementation.

In U.S. Pat. No. 4,905,302 issued to Childress, et al. discloses another trunked radio communications system, known as EDACS, that provides substantial improvements in channel acquisition and channel drop, and in reliability of critical control signaling. The system uses a much higher digital signaling rate than is typically found in prior art systems, and uses a control channel to convey digital channel request and assignment messages between the central site and mobile transceivers. The mobile radio systems transmit channel requests on the inbound control channel (if no response is received, the mobile retries during a retry time window which increases in duration in dependence on the number of retries). The mobile transceiver switches to a working channel in response to an assignment message received on the control channel. Digital signals transmitted on the control channel and subaudible digital signal transmitted on active working channels allow late entry, shifting to higher priority calls, and other advanced functions. Message and transmission trunking capabilities are both present so as to maximize working channel usage without compromising channel access for high priority communications. During transmission, the calling as well as the calling transceivers return to the control channel after each transmission (and called transceivers may be inhibited from transmitting) but grant higher priority to calls from the other transceivers being communicated with to ensure continuity over an entire conversation.

It is desirable to monitor various users of a communication system, but without any capability of transmitting. Conventional communication systems are easily monitored with a variety of radio communication receivers. One example of this type of radio communication receiver is a scanner. Scanners are radio receivers that typically cover a range of frequencies between approximately 30 MHz and 1 GHz. The scanning receiver is sequentially tuned through a set of predetermined, user selected frequencies. If a signal is detected, the scanner stops scanning and remains tuned to that frequency until the signal ceases, whereupon the scanner resumes searching for another frequency. The typical scanner is comprised of a receive-only radio without any capability of transmitting a signal. Such scanning receivers are inexpensive and enable a user to hear transmissions on a conventional radio system with little effort on the part of the user, and little or no effort on the part of the communications systems operator. A conventional scanner is not able to correctly follow a sequence of transmissions on a trunked radio system because the scanner has no ability to understand the outbound channel assignment messages sent by the trunking system controller.

U.S. Pat. No. 5,784,388 issued to Knox discloses several significant improvements to a conventional scanner and improves the ability to decode the messages from a Motorola trunked system control channel. The system disclosed in Knox decodes encoded data from the control channel of a trunked radio communications system. The decoder includes a de-interleave, an auto synchronization sequence combiner, and a table lookup error detector to recover the transmitted information and also indicates whether any errors are present in the recovered information. However, the advancement disclosed by Knox requires that the scanner be specifically designed and manufactured to operate for use with Motorola trunked radio communications systems. Additionally, the system disclosed by Knox requires that the operator of the scanner be able to identify the various types and characteristics of a trunked system, the particular radio frequencies of the system as well as to program these details into the scanner or computer.

In the case of the EDACS trunking system, the data messages transmitted by the system controller do not contain frequency information. EDACS messages only contain logical channel numbers. EDACS mobile units are pre-programmed with a frequency table that allows the mobile unit to associate a specific radio frequency with logical channel numbers. To properly tune a scanning radio to an EDACS working channel, the user must know which frequencies are assigned to the system.

Therefore, there is a need for providing a method and apparatus for monitoring trunked radio communications system that automatically determines the characteristics and frequencies of trunked radio communications systems, thus, eliminating the need for a user to program these details.

SUMMARY OF THE PRESENT INVENTION

A preferred embodiment of the present invention provides a method and apparatus for monitoring a trunked radio communications system by using some type of radio scanning receiver that is not designed for that purpose.

In accordance with the purpose of the invention, as embodied and broadly described herein, the invention relates to provide a method for automatically determining the polarity of the received control channel data.

Further in accordance with the purpose of the invention, as embodied and broadly described herein, the invention provides a method for automatically determining the type of trunked radio communications system. In addition the invention provides a method for automatically determining the bit rate of transmitted digital signals over a control channel of a trunked radio communications system.

Further in accordance with the purpose of the invention, as embodied and broadly described herein, the invention provides a method for automatically determining the frequencies used in a trunked radio communications system.

The preferred embodiment of the present invention for monitoring communications in a trunked radio communication system includes a personal computer with a sound card for sampling the baseband, a frequency tunable receiver, a zero crossing detector to convert PCM samples to NRZ equivalent, a plurality of preamble correlators to detect the phase, bit rate, polarity and type of trunked radio communication system, a bit phase compensator to recover the transmitted data from the sampled data stream, decoding means to decode transmitted digital control channel messages and respond to channel assignment messages from a decoded working channel.

An alternative of the preferred embodiment uses a microcontroller such as the one used to control a receiver scanner. In this embodiment, the pre-calculation steps are carried out once, during the programming of the micro-controller. Additionally, the incoming data bits are sampled directly using an input port on the micro-controller, rather than using a sound card. Here, the sample rate is selected from a possible set of values for a given the micro-controller architecture and its associated clock rate.

Advantages of the invention will be set forth, in part, in the description that follows and, in part, will be understood by those skilled in the art from the description herein. The advantages of the invention will be realized and attained by means of the elements and combinations particularly pointed out in the appended claims and equivalents.

BRIEF DESCRIPTION OF THE DRAWINGS

The accompanying drawings, which are incorporated in and constitute a part of this specification, illustrate several embodiments of the invention and, together with the description, sever to explain the principles of the invention.

DETAILED DESCRIPTION OF A PREFERRED EMBODIMENT

The present invention now will be described more fully with reference to the accompanying drawings, in which the preferred embodiments of the invention are shown. The present invention may, however, embodied in many different forms and should not be construed as limited to the embodiment set forth herein; rather these embodiments are provided so that this disclosure will be thorough and complete and will fully convey the invention to those skilled in the art.

Figure 1:
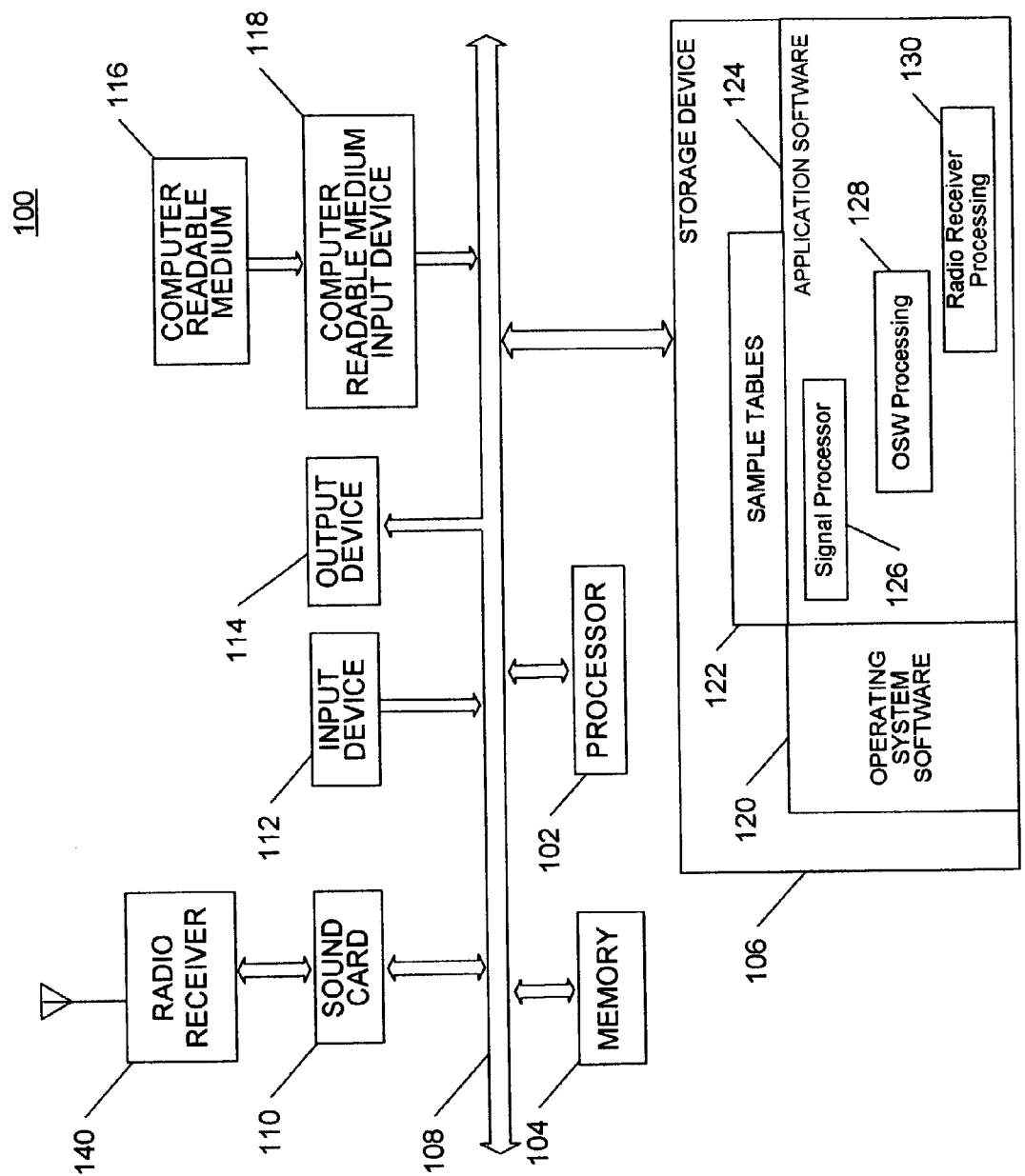
FIG. 1 is a block diagram that illustrates how the embodiment of the present invention can be implemented.

FIG. 1 shows a typical radio monitoring system 100 that is programmed to perform the functions of monitoring a trunked radio communications system. The system 100 includes at least one processing element 102 (any 32 bit processor or processors is appropriate), main memory 104 and some storage device 106. The storage device 106 of the system 100 stores the operating system software 118, application programs 124 and a database containing a plurality of sample tables 120.

As FIG. 1 shows the storage device 106 includes a series of application programs 124 that comprise a signal processing program 126, an OSW processing program 128 and a radio control program 130. In accordance with the present invention, these application programs, either singularly or in combination, direct various system components of radio monitoring system 100 such as sound card 110 in conjunction with the frequency tuned radio receiver 140 to automatically identify the type and data rate of any industry standard, commercially available trunked radio communications system from the digital message transmitted across the control channel.

By selecting a sampling rate substantially higher than the highest expected trunking control channel data rate, the signal processing software can be designed to identify and decode any of the desired trunking systems without changing the sampling rate. This is advantageous, since most personal computer sound cards are limited to only a few rates. For example, most common personal computer sound cards can sample at 11.025 kHz, 22.05 kHz and 44.1 kHz.

By using the appropriate sampling rate generated by the sound card, as well as a unique signal processing application facility, the present invention scans a range of frequencies, determines the type of radio system, analyzes the extracted information to obtain the channel assignment code and talk group identification code and comparing the agency or group talk identification code, tuning the frequency tuned radio receiver to a working voice channels in order to monitor a truncked communications system. As will be disclosed in detail in FIG. 3, the present invention includes a bit phase compensator (BPC) that comprises a sample counter, sample selector and bit phase compensator table selects appropriate samples from the incoming sample stream, producing a synchronized output bit data stream at the rate originally transmitted by the trunking system control channel transmitter.

For example, selecting a sampling rate of 11.025 kHz maybe acceptable for on a Motorola system running at 3600 baud, but it does not provide enough samples to accurately decode data from an EDACS radio system running at 9600 baud. Selecting a sampling rate of 22.05 kHz allows for the accurate decoding of an incoming data stream from either Motorola radio systems or EDACS radio systems.

Furthermore, a person of ordinary skill in the art will understand the systems 100 may also includes such components as a keyboard, a mouse, and a one or more display devices, such as a high resolution monitor. In addition, the storage device 106 for system 100 will includes devices such as floppy disk drives, CD-ROM drives, or DVD players that are capable of reading computer instructions that has been stored on a compatible computer readable medium.

In the following discussion, it is understood that the appropriate processors 102 (or similar processors) perform the steps of methods and flowcharts discussed preferably executing instructions stored in storage device 104. It is also be understood that the invention is not limited to any particular implementation or programming technique and that the invention may be implemented using any appropriate techniques for implementing the functionality described herein. In addition, the present invention is not limited to any particular programming language or operating system.

The software stored in storage device 106 may have been supplied from computer-readable medium 116. Execution of the sequence of instructions retrieved from the storage device 106 causes the processor 102 to perform the steps of monitoring a trunked communications system described herein. In addition, alternative embodiments of the present invention are not limited to any specific combination of hardware and software.

The term "computer-readable medium" as used refers to any medium that provides the sequence of instructions to a processor for execution. Such a medium may take many forms including, but not limited to, volatile media, non-volatile media or through a transmission media. Non-volatile refers to includes either optical or magnetic data storage media. Volatile media refers to various types of dynamic memory. Transmission media includes application content and data sent via coaxial or fiber optic cable or those transmitted via acoustic, light, radio, or infrared data communications facilities. Common forms of computer-readable media include, a floppy disk, a flexible disk, a hard disk, magnetic tape, or any other magnetic medium, a CD-ROM, any other optical medium or any other physical media such as PROM, EPROM, FLASH-EPROM, any other memory chip or cartridge, a carrier wave as or any other medium from which a computer is able to read a sequence of program instructions, applications content or data.

Various forms of computer readable media may be involved in carrying one or more sequences of instructions to a processor for execution. For example, the instructions may initially be carried on a magnetic or optical disk to and from a remote computer. As shown in FIG. 1, bus 108 carries either a sequence of program instructions, and applications content to the main memory 104, from which a processor 102 retrieves and uses the instructions and applications content. The instructions received by main memory may be stored on a storage device 106 either before or after execution by a processor 102. The instructions can also be transmitted via a carrier wave via a network, such as a LAN, a WAN, or the Internet.

Figure 2A:
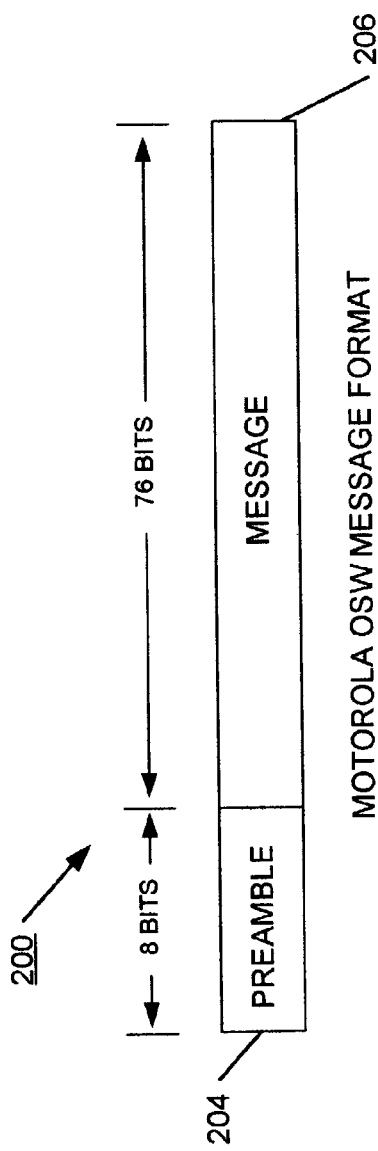
FIG. 2 shows the message formats of both the Motorola and EDACS radio communication systems.
Figure 2B:
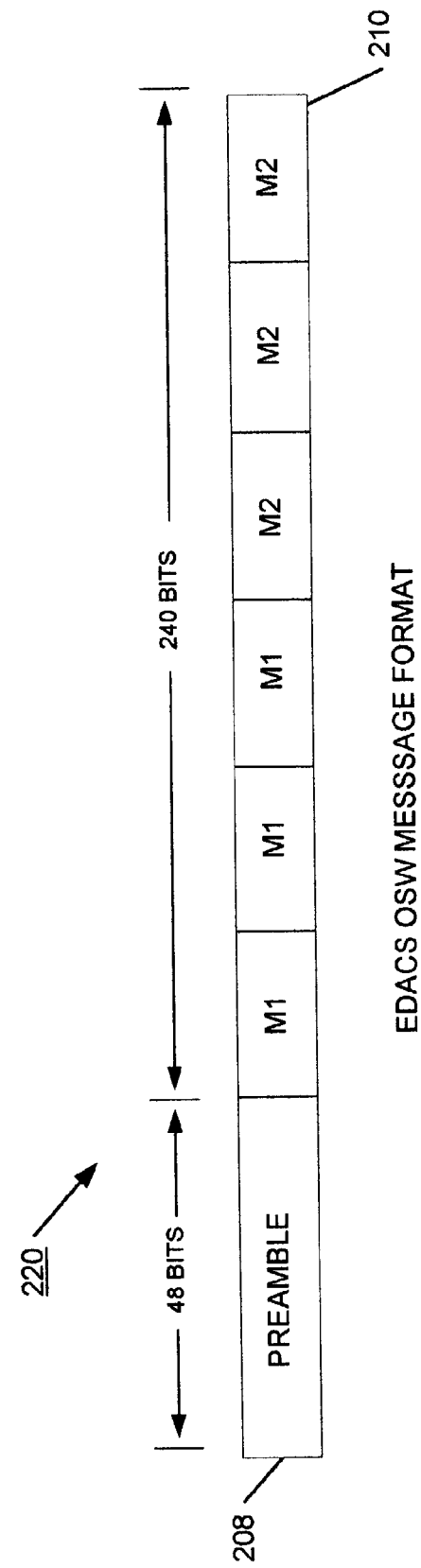

FIGS. 2a and 2b show the message formats of both the Motorola and EDACS radio communication systems. Modernly, most trunked radio communications systems have a number of different features and capabilities. These can be transmission rate, message type, and error correction, for example. But one of the most common characteristics for all these radio systems is the format of a typical transmitted message. Typically, each message includes a preamble and an information frame. As illustrated in FIG. 2a, the format of a message 202 transmitted by a Motorola trunked dispatch or radio communication system includes a preamble 204 that is eights bits long and an information frame 206 that is seventy-six bits long. FIG. 2b shows the message format of an Enhanced Digital Access Communications System (EDACS) that includes a preamble 208 that is forty-eight bits long and an information frame 210 that is two hundred-forty bits in length. In either case, the preamble comprises a predetermined sequence of bits that has a set of low auto-correlation characteristics that allow the processing unit of a mobile radio to rapidly synchronize its decoding logic to an incoming signal. In addition, the preamble can be used to determine at what instant in time the information frame will arrive. Here the information frame includes a data message that is preceded by a predetermined bit pattern or code that is added to the data message prior to transmission so that any errors that might occur can be detected or corrected by the receiver or scanner.

Figure 3:
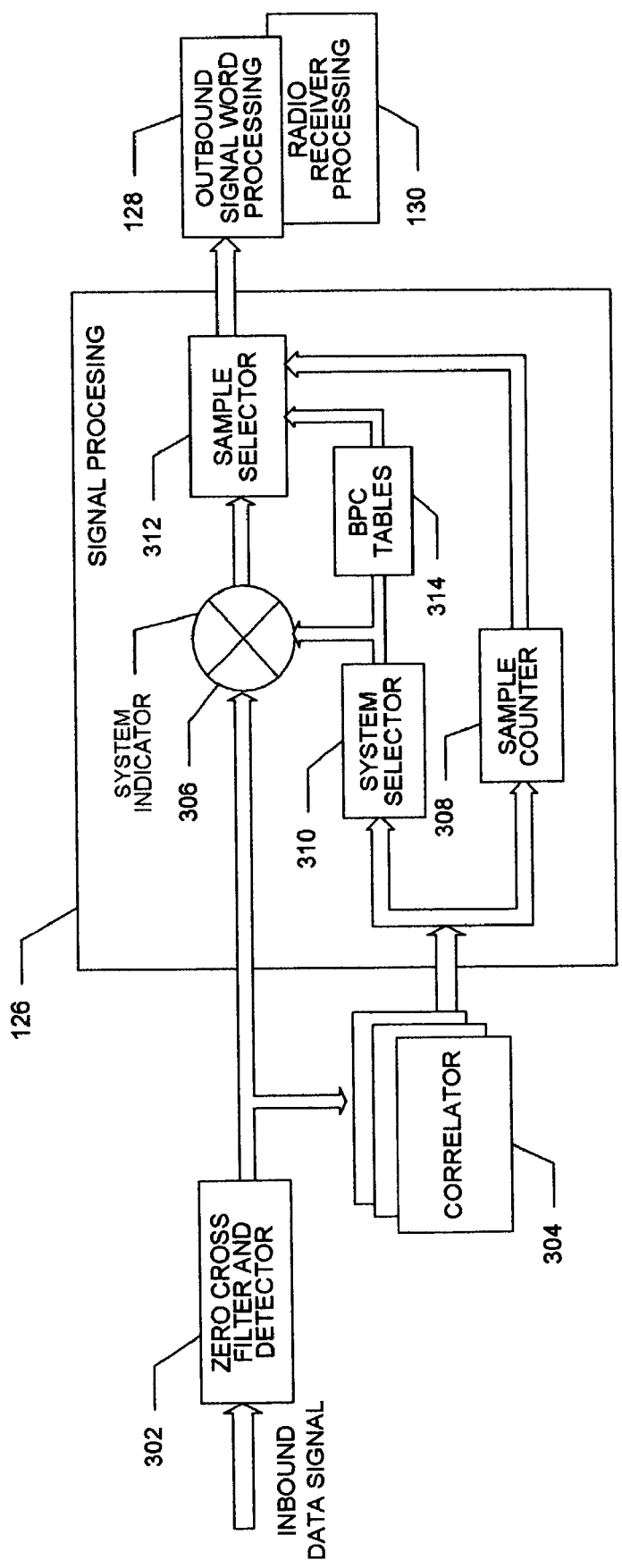
FIG. 3 is a block diagram of the signal processing application program as implemented by the present invention.

Reference is now made to FIG. 3 which is a detailed block diagram of the signal processor as implemented by the present invention. As FIG. 3 shows a zero cross filter and detector 302 and correlator array 304 precedes the signal processor 126. As the data message is processed, the zero cross filter and detector 302 detects the polarity of each bit in the incoming data stream, converts the received data stream from PCM to its NRZ equivalent and directs the converted data stream to the correlator array 304 and the polarity inverter 306. Here, the correlator array 304 is a multi-element software mechanism that compares the incoming received samples with a predetermined set of test values. By performing this function, the correlator array 304 identifies the type of radio system, the polarity of the data, and the proper position in the BPC table to enable the correct rendering of the data stream at the correct rate.

As shown in FIG. 3, the signal processor 126 includes a polarity inverter 306, system selector 310 and a sample selector 312. In addition, a bit counter 308 and a bit phase compensator table (BPC) 314 are directly interfaced to the sample selector 312. The bit counter 308 maintains a count of the number of the bits received and directs the sample selector 312 in selecting samples the high rate data.

Responsive to the results of the correlator array 304, the radio system selector 310 switches to the appropriate radio system and selects the appropriate BPC table 314. As shown here, the inbound data stream is introduced to the polarity inverter 306 that inverts the polarity of any data bits or samples in the received data stream from negative to positive, thus, directing an all positive data stream to the sample selector 312. The sample selector 312 receives the data stream and reconstructs the coded information frame in accordance with the corresponding bit selection from the BPC table 314.

Also as FIG. 3 shows, a bit phase compensator (BPC) comprises the sample counter 308, sample selector 312 and the BPC table 314. The bit phase compensator (BPC) compensates for the random phase relationship between incoming samples and the transmitted information bits, and produces an output information data stream at the data rate of the originally transmitted information. The bit phase compensator (BPC) processes the incoming high rate data stream whose polarity has been corrected by polarity inverter 306, and produces an output data stream that is a reconstruction of the originally transmitted data. Incoming samples are processed one at a time.

Figure 4:
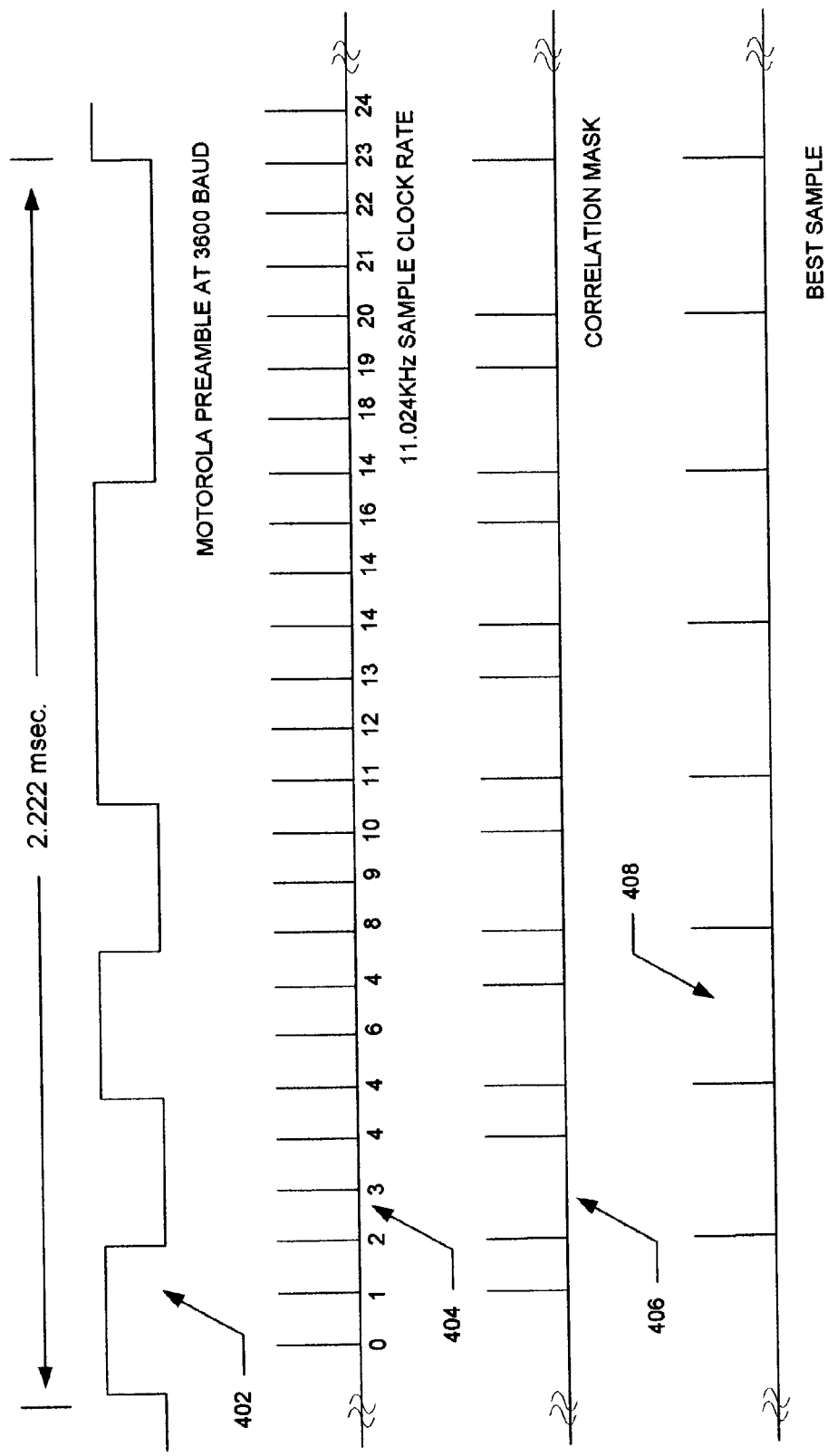
FIG. 4 is a diagram that illustrates the determination of the best sample for a preamble at 3.6 Kb of a Motorola radio system.

FIG. 4 is a graphical illustration that shows a preamble at 3.6 Kb for a Motorola radio system and by applying the appropriate correlation mask a sequence of preferred samples can be calculated as implemented by the present invention. As FIG. 4 shows the preamble of a Motorola radio system at 3.6 Kb 202 and a representative sampling rate of 11.025 KHz 404. By applying the correlation mask 406, in accordance to the method described above to the preamble 402, the best samples are then selected 408. As FIG. 4 shows, there are more samples in the incoming sample stream than information data bits. The bit phase compensator (BPC) selects the best sample for each information bit and ignores other samples. The sample counter 308 addresses a row in the BPC table 314. As each incoming sample is processed, the sample counter 308 is then incremented by one. When the end of the table is reached, the sample counter 308 is reset to zero, so the progression through the BPC table 314 represents the repeating phase relationship between samples and information data bits.

Each row of the BPC table 314 has an indicator for the best bit for each sample. When a BPC row is accessed that is designated as a best bit, the incoming high rate bit is transferred to the output. If the best-bit indication is off, the high rate sample is ignored. Since the sample counter 308 is preset by the one of the correlators in the correlator array 304 when a preamble is detected, the BPC table 314 is then synchronized to the proper point in the repeating phase sequence of samples. Thus the output from the BPC table 314 contains fewer bits than the number of samples in the incoming data stream. This corresponds to the difference between the chosen sampling rate and the information data rate sent by the trunking control channel transmitter.

The reconstructed information data stream is then presented to the OSW processing element 128. This element scans the data stream for the beginning of the information data frame, determines the type of message, and extracts frequency and talk group codes from the messages. Once the frequency and talk group information have been extracted, the radio receiver processing element 130 the tunes the radio to the appropriate frequency in order to receive the voice transmission.

In the case of the EDACS trunking system, the OSW messages do not contain frequency information, only contain logical channel numbers. To properly tune a radio to an EDACS working channel, the receiver processing element 130 must know the frequency that corresponds to the logical channel number in the message.

To discover the frequencies in use in an EDACS system, the receiver processing element employs an adaptive search method described here. First, tables in the computer memory are created containing five integer data elements for each potential radio frequency. The data elements are the active count, inactive count, test count, fail count and the lock indicator. One table is created for each logical channel whose frequency is unknown. The number of possible radio frequencies is large, but limited by factors such as channel spacing and the way frequencies are assigned to users by the government frequency management authority.

When an OSW message is received with a logical channel number whose frequency is unknown, the receiver processing element 130 begins a frequency search. When searching, frequencies above and below the control channel are sequentially tuned at fixed steps. As each frequency is tuned, the receiver processing element determines if a signal is present on the frequency. If a signal is present, the active count is incremented. If a signal is not present, the inactive count is incremented. After the appropriate counter is incremented, another frequency is selected and the process is repeated. This process continues for a user configurable time, typically two seconds, the receiver processing element then terminates the search and returns to the trunking system control channel to decode more OSW messages.

The receiver processing element 130 takes an additional step to validate the information collected during the searching process. Each time a new OSW message with an unknown logical channel number is decoded, the frequency with the highest ratio of active to inactive counts is tuned first, before the sequential search is begun. If a signal is found to be present, the test count in the table is incremented. If there is no signal, the fail count is incremented. Channels with more than a few fail counts can be ruled out.

If the test count for a frequency exceeds a user configurable threshold level, and the fail count is very small or zero, the receiver processing element forgoes the searching process and remains tuned to the frequency to allow the user to listen to the transmission. The user can decide to accept the frequency, in which case the receiver processing element will permanently associate the frequency with the logical channel. The user can also decide that the transmission being heard is not from the trunking system, and the receiver processing element sets the lock indicator. Once the lock indicator is set, the frequency is no longer considered a candidate, and will be ignored in future searching activities. If the user takes no action, the receiver processing element 130 handles the transmission the same way as it would a normal EDACS transmission where the logical channel association was known, i.e. returning to the control channel after the transmission ends. Thus, after some period of time, the receiver processing element 130 will gradually discover the logical channel to frequency relationship, and scanning the EDACS system will approach normal.

FIGS. 5a–5d is flowcharts illustrating the steps used to calculate the values in the BPC table 314. Each of the steps shown are carried out for once each combination of sample rate and system baud rate that are the stored as table functions to be used during the correlation and bit phase compensation processes.

Figure 5A:
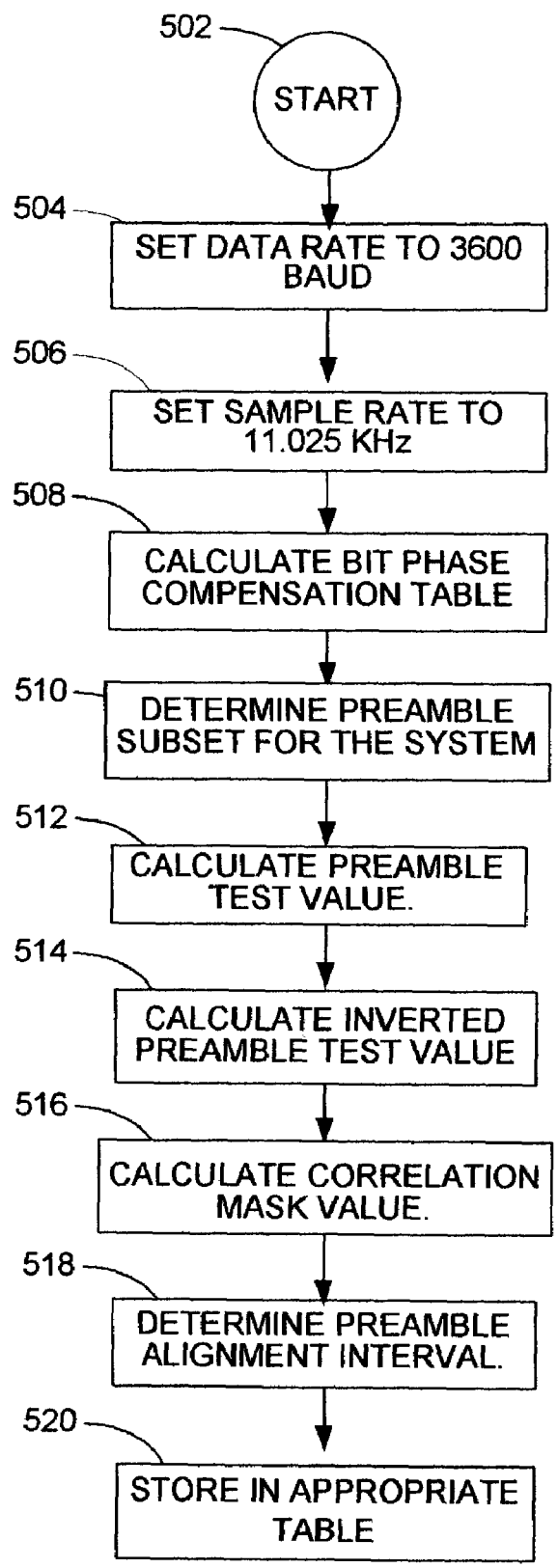
FIGS. 5a–5e is flowcharts illustrating the steps used to calculate the values in the BPC table.
Figure 5B:
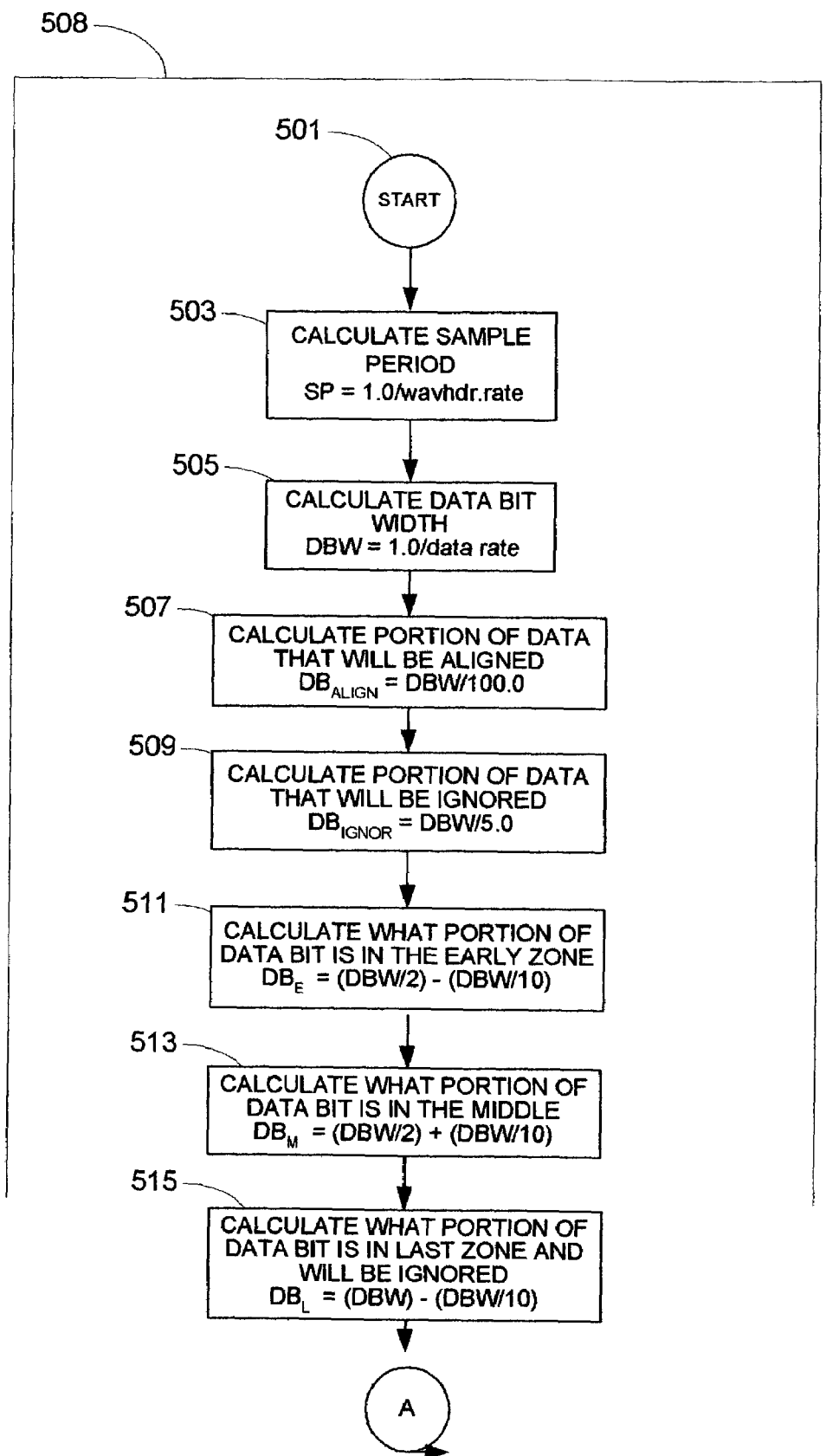

As shown by FIG. 5a, at step 504, the data rate is set to 3.6 Kb while, at step 506 the sample rate is set to 11.025 KHz. Once these two parameters have been set, at step 508, the monitoring system calculates the values that are required for the bit phase compensation table. The calculation of the values for the bit phase compensation table, at step 508, comprises a series of intricate of steps that are shown in FIGS. 5b to 5e. As shown in FIG. 5b, to obtain the necessary values required for the bit phase compensation table, a series of calculations are performed that includes calculating the sample period (at step 503), determining the data bit width DBW (at step 505) and calculating data bits alignment (at step 507). Next the monitoring system calculate what portion the received data bits are to be ignored (at step 509), what portion of the received data bits are positioned in the early zone (at step 511), what portion of the received data bits are in the middle zone (at step 513) and what portion of the received data bits are last and thus, will be ignored (at step 515).

Figure 5C:
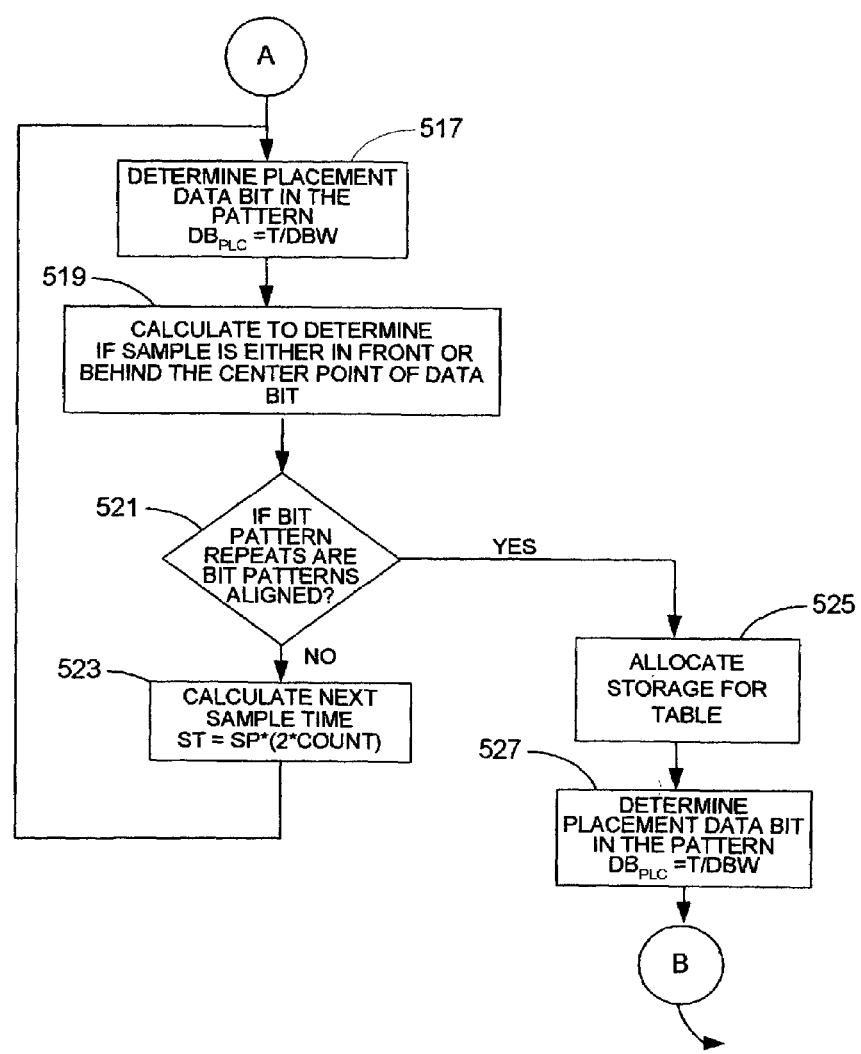

As FIG. 5c shows, the monitoring system, at step 517, determines the placement of the data bit in the pattern and then, at step 519 determines if the received sample falls either in front of or behind the center point of the DBW. Once the it has been determined that the sample is either in the in front or behind the center point of the DBW, the monitoring system, step 521, determines if the received bit pattern is repeated and if the bit pattern is aligned. If the repeated bit pattern is not aligned, at step 521, the monitoring system, at step 523, then proceeds to calculate the next sample time and repeats steps 517 to 521 until the bit pattern that is repeated is aligned. But if the repeated bit pattern is aligned, the monitoring system at steps 525 and 527 respectively, allocates enough space to store the bit phase compensation table and determines the placement of the data bit in the bit pattern.

Figure 5D:
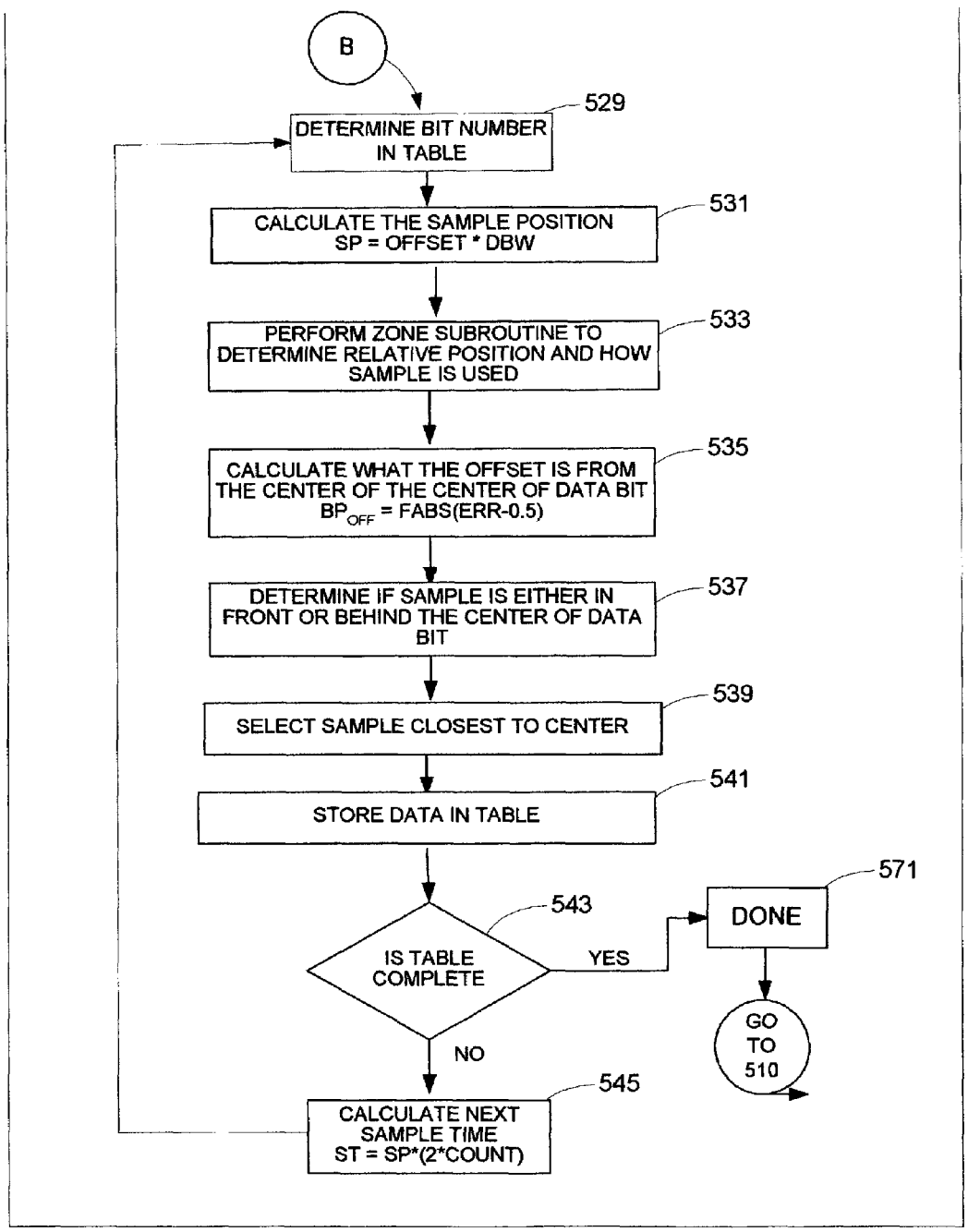
Figure 5E:
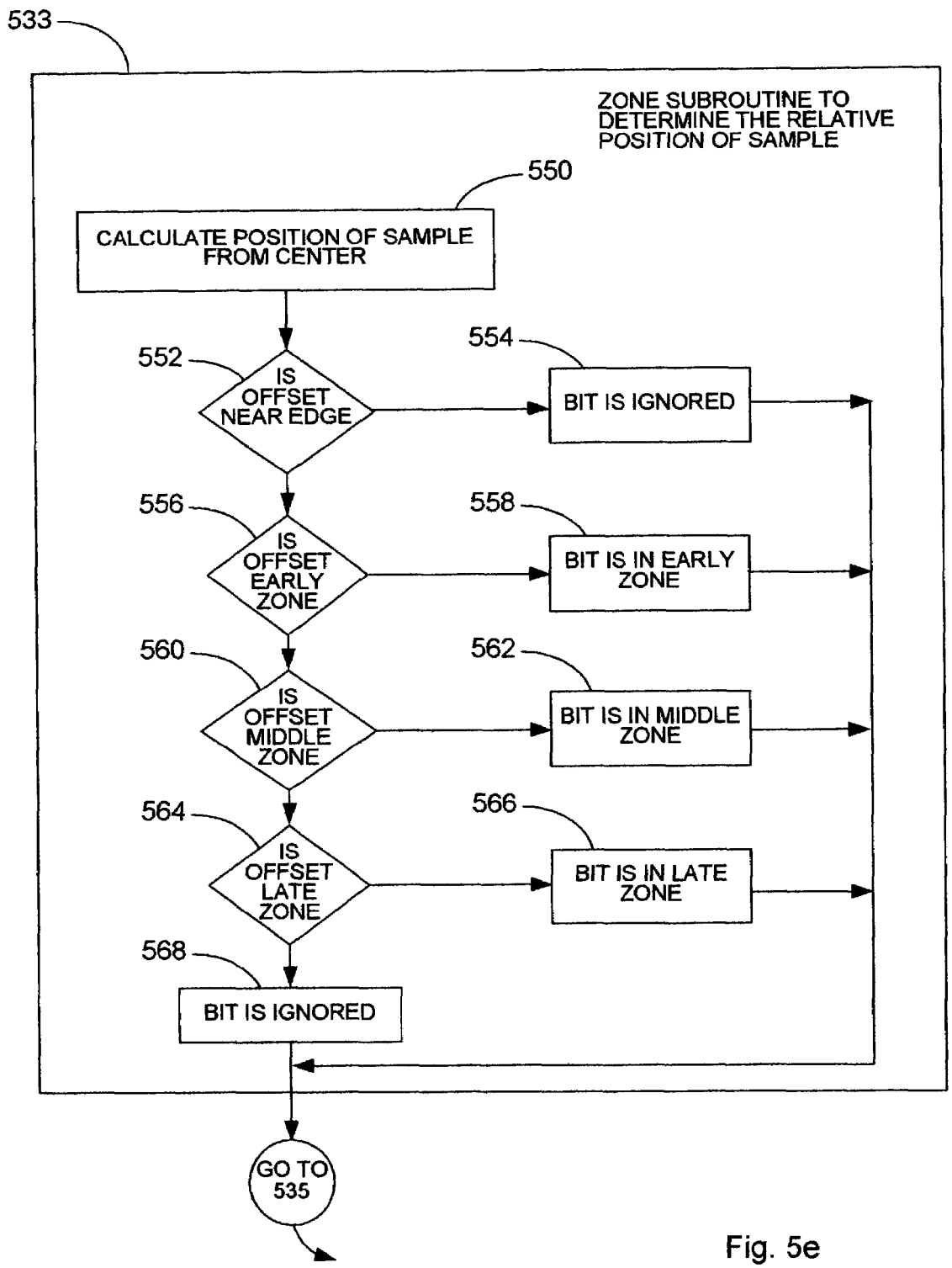

At this point in the process, the monitoring system performs a number of subroutines to determine what will be the best sample to use. As FIG. 5d shows, at step 531, the monitoring system calculates the position of a sample and then, at step 533, performs a zone subroutine to determine the relative position of the specified sample. Referring to FIG. 5e that show, in detail, the method, at step 533, used to determine the relative position of a sample. As FIG. 5e shows at step 550, the mentoring system calculates the actual position of the sample in accordance to one of three zones and if it is to close to the near edge of the received pattern. Thus, if, at step 552, the offset of the sample is to close to the edge, then at step 554, the sample will be ignored. But if the offset is just beyond the near edge then at step 556 the sample is said early, then the bit is classified, at step 558, as being in the early zone. If the offset, at step 560, places the sample somewhere close to the middle, then it is classified, at step 562, as being in the middle zone. If the offset, at step 564, places the sample beyond the boundaries of the middle zone, then the sample is classified, at step 566, as being late and those samples that are even beyond the late zone, at step 568, are ignored.

Once the position of the sample has been determined relative distance from the center of the data bit is calculated at step 535. This then is used, at step 537, to determine if the sample is either in front of or behind the center data bit. Then at step 539, the sample closest to the center is selected and store in the bit phase compensation table. If the table is not complete (i.e. the best sample has not been found) then, at step 545, a new sample time is calculated and steps 529 to 545 are repeated. But, if the table is complete, then, at step 571 process of finding the best sample is done and the monitoring system proceeds back to step 510 to calculate the preamble test value.

The signal processor, at step 510, selects the preamble subset for each radio system to be monitored. The preamble subset is then used by the correlator to detect the presence of the desired radio system. This means that the bit phase compensation table calculated at step 508 for a Motorola radio system with a sampling rate of 22.05 kHz has 49 entries and spans 8 bits of 3600 Baud data, while a EDACS data sampled at 22.05 kHz requires 147 samples to span 64 bits of 9600 baud of data. Thus, in the case of Motorola systems, where each data frame contains an eight-bit preamble, the entire preamble fits exactly in a complete set of 49 samples. Thus, the Motorola correlator for samples at 22.05 kHz will require only a single preamble value. On the other hand, the EDACS data format has a 48-bit preamble. As a result, there are thirteen possible positions for the EDACS preamble in a set of 64 samples. For maximum speed, the EDACS correlator should compare each of the thirteen possible values. However, if simplicity is desired over speed, then less than thirteen values can be used.

Once the preamble subset has been determined, at step 512, the preamble test values used by the correlator are then calculated. The value is computed by setting bits in the test value corresponding to the preamble bit values selected in the previous step. Thus, a portion of system memory that is large enough to accommodate the test values is reserved. Since the Motorola system at 22.05 kHz requires 49 bits, seven eight-bit bytes are required, or two 32-bit words. The initial value of each bit is set to zero. For Motorola systems a preamble value of 'AC' in hexadecimal notation is used. The first bit from the preamble subset from step 506 is placed in each bit position of the test value according to a predefined sequence of data bits. Likewise, the remaining bits are similarly placed in the test value and those bits in the test value that are to be ignored are set to zero. If the preamble subset contains fewer bits than are spanned in one set of samples (EDACS for example), additional test values are calculated by shifting the original preamble value and repeating this process.

Now that the preamble test value has been calculated, at step 514 the inverted preamble test value is calculated. In this step, the correlator test value is calculated for an inverted system. This additional value is calculated by inverting the bits calculated for a test value (step 508), and then resetting bits in the inverted test value that are marked as ignored are set to zero. At step 516, the correlation mask value is then calculated for each preamble test value. The correlator uses this value to select which bits will be compared. Each mask value has the same number of bits as the preamble test value. Each mask value initially contains all zeroes. Bits in the mask value that are set correspond to the bits found in the bit phase compensation table that are not ignored. Thus, for the Motorola radio system sampled at 22.05 kHz will have the following values:

Motorola preamble: 'AC'
Motorola test value: '01F81F81FFE000'
Motorola mask value: '01F7DF7CFBEFBE'

Then the system, at step 518, determines the minimum preamble alignment interval. In this step the expected frequency of a preamble aligned in a set of successive samples is determined. First, the number of incoming samples per transmitted data word is calculated. For a Motorola system that transmits a data word containing an 8 bit preamble and a 76 bit information frame, a set of 49 samples at 22.05 kHz will span 8 bits of transmitted data will require approximately 514.5 successive samples (i.e. 84/8×49). Since this result is not a whole number, the correlator will only be able to detect a preamble in the incoming data every 1029 samples (514.5×2). It also should be noted that even though the preamble may not be aligned for every message, the bit phase compensator will render the correct transmitted data. Once these values have all been calculated, at step 520, they are stored in an appropriate set of tables to be used by the signal processor 126 to decode and monitor a plurality of trunked radio systems.

Figure 6:
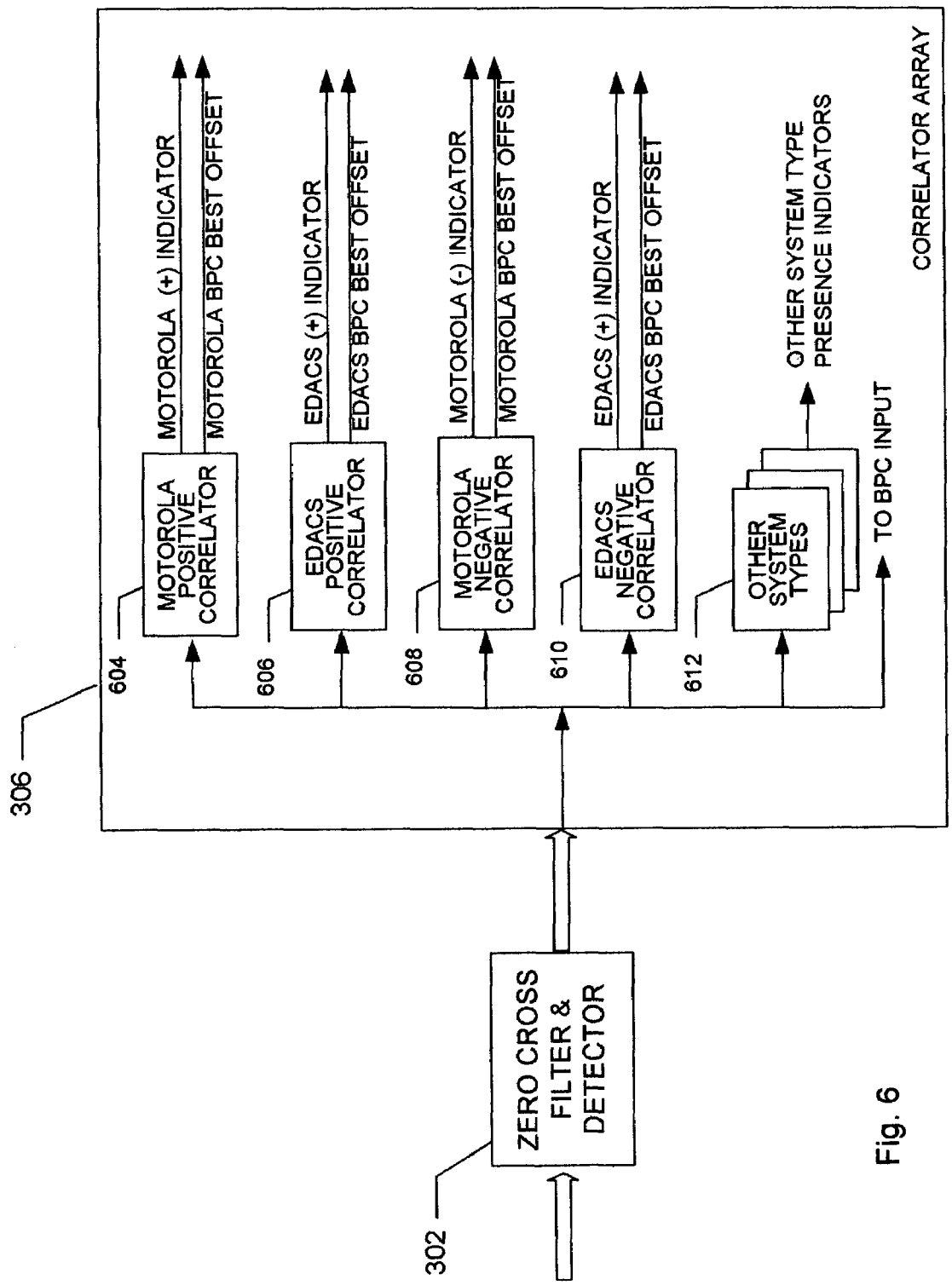
FIG. 6 is a block diagram that details the operative elements of the correlator array in accordance with FIG. 3.

Reference is now directed to FIG. 6 is a block diagram that details the operative elements of the correlator array in accordance with FIG. 3. As previously mentioned the zero cross filter and detector 302 detects the polarity of each bit in the incoming data stream, converts the received data stream from PCM to its NRZ equivalent and directs the data stream to the correlator array 304. As FIG. 6 shows, the correlator array 304 is a multi-element software mechanism that processes incoming samples and detects the presence of a system by scanning the incoming samples for the pre-calculated preamble test value, masked by the corresponding mask value. As shown in this illustrative view, the correlator includes a set of Motorola positive 604 and negative 608 correlators, a set of EDACS positive 606 and negative 610 correlators as well as a set of positive and negative correlators 612 for each of the other designated radio systems. As a result, the positive data bits or samples of the incoming data message from a Motorola radio system are directed to and correlated by the Motorola positive correlator 604 while the negative data bits or samples are directed to and correlated by the Motorola negative correlator 608 simultaneously and in parallel.

Figure 7:
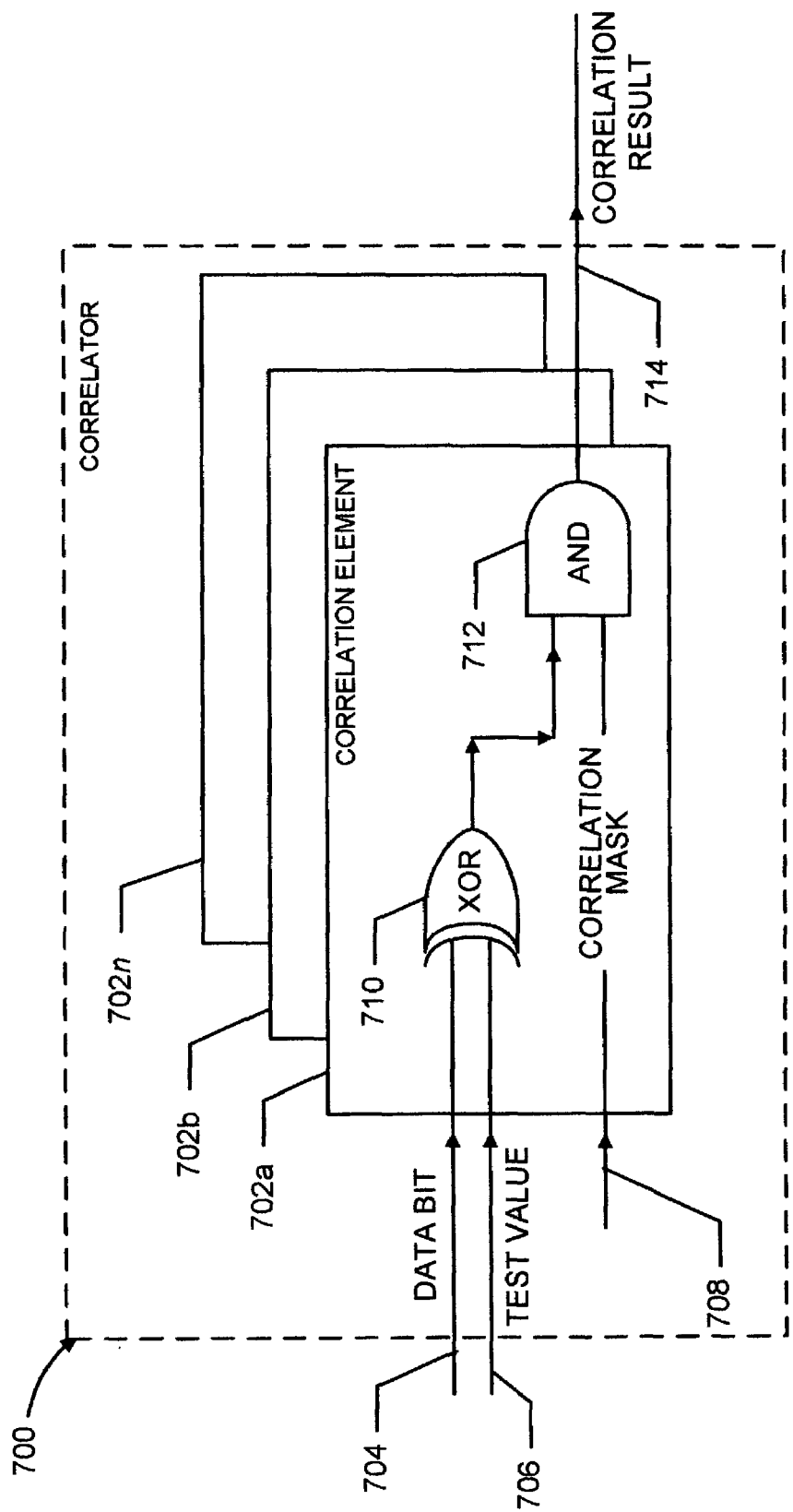
FIG. 7 is a schematic diagram detailing the logic functions of the correlation elements of a correlator in accordance with the implementation of the correlator array shown in FIG. 6.

FIG. 7 is a schematic diagram detailing the logic functions of the correlation elements of a correlator in accordance with the implementation of the correlator array shown in FIG. 6. As FIG. 7 shows, correlator 700 includes a plurality of correlation elements 702a–702n. Each correlation element 702a–702n includes an exclusive-OR (XOR) 710 and an AND logic function 712. As one ordinarily skilled in the art will realize and appreciate that the process of correlating a plurality of incoming data bits can be performed in parallel depending on the processor and configuration of system used. For example, the test and correlation mask values of a Motorola radio system are approximately 49 bits in length when sampled at 22.05 kHz. As a result, an eight-bit microcontroller used in a radio system will require approximately seven iterations to perform the required correlation function. But, if a personal computer system having a 32-bit processor such as Intel Pentium III™ or IV™ is used, it will only takes a relatively small number of machine cycles to perform the same function. But for this embodiment, those components in the figures that comprise a number of elements will be clearly referenced, as such but for the purposes of clarity, the individual, single operative components of correlation element 702a will be used specifically for this discussion.

As FIG. 7 shows the exclusive-Or 710 receives data bits and test values via input nodes 704 and 706, respectively and computes a resultant value that is then directed to an "AND" logic function 712. Here, the "AND" function 712 combines the value received from the exclusive-OR 710 with a correlation mask value received via input node 708 that produces a correlation result 714. If the output from the "AND" logic function is all zeroes, indicating that the test value matches the incoming data bits in all positions, then correlation result is a positive match. When a positive match is detected, the correlator 700 saves the value accumulated by sample counter 308 and then resets the counter 308 to zero. In addition, if the saved value is equal to a specific pre-calculated minimum preamble alignment interval or it is at least equivalent to an integer multiple of that value and if the position of two preamble codes detected in the incoming data stream are consistent with the length of the transmitted data messages, there is a high probability that the appropriate system has been identified. If so, the system selector 302 is then set to the identified system type, and the bit phase compensator 310 is reset, indicating that the sampled data is aligned.

It should be also noted that it is possible for the preamble bit sequence to appear in the body of a data message, thus giving rise to the possibility of a false detection of the preamble. Looking for multiple preamble codes in the incoming sample stream at intervals of the expected message length reduces, but does not eliminate, the possibility of a false detection. It is understood that the error correction and cyclic redundancy features inherent in a transmitted data message will further reduce the possibility of decoding an invalid message to an acceptable level, as well.

An alternative embodiment of the present invention envisions uses a micro-controller such as the one used to control a receiver scanner. In this embodiment, the pre-calculation steps are carried out once, during the programming of the micro-controller. Additionally, the incoming data bits are sampled directly using an input port on the micro-controller, rather than using a sound card. Here, the sample rate is selected from a possible set of values for a given the micro-controller architecture and its associated clock rate.

Although the invention has been described with respect to certain preferred embodiments, modifications and additions within the spirit of the invention will occur to those of skill in the art. Therefore, the scope of the invention is not limited by the foregoing description but is defined solely by the following claims.

What is to be claimed is:

1. A method of monitoring communications in a trunked communication system comprising the steps performed by a monitoring system of: setting both an appropriate data and sampling rate, wherein the sampling rate is set to a level which is higher than a maximum expected trunking control channel data rate; receiving a plurality of digital data messages on a control channel transmitted from at least one trunking radio system wherein each digital data message includes a preamble and a coded information frame; identifying the polarity of the incoming digital data messages; sampling the received digital message at the sample rate; identifying type and data rate of the trunking system, wherein the type and date rate are identified by comparing incoming samples to pre-calculated set of preamble patterns; calculating a plurality of parameters and values based on the data characteristics that allows a decoding element of the monitoring system to be suitably receive and reconstruct the coded information frame for the apposite radio system and at the appropriate data rate further comprising the steps of; calculating the required values and parameters of the bit phase compensation table; generating a subset of the preamble message; calculating the preamble test value that allows the correlator array to establish the type of radio system and speed at which the radio system is transmitting its digital message; computing the inverse preamble test value used for the data messages of those radio systems that are found inverted radio system; generating a plurality of correlator mask values that are calculated for each test value that the correlator array uses to select the data bits in the preamble to compared; determining an appropriate preamble alignment interval; selecting an appropriate set of parameters and values based upon the system type identified; and reconstructing the stream of digital messages by selecting samples from the sample data stream to produce an output data stream.

2. The method as recited in claim 1, wherein if the polarity of the data stream of an incoming digital data message is negative, inverting the polarity of that data stream to be positive.

3. The method as recited in claim 1, includes the step of searching a selected frequency band to discover a logical channel to frequency associations.

4. The method as recited in claim 1, wherein the selected sample rate must be high enough so as to generate a bit phase compensator table can be built that encompasses all required incoming bits.

5. The method as recited in claim 1, wherein the plurality of parameters and values are stored in at least one lookup table.

6. The method as recited in claim 1, wherein the codes that specify the talk group and channel assignment are extracted from the reconstructed coded information frame.

7. The method as recited in claim 6, wherein the talk group and channel assignment codes are compared to an array of stored, predefined codes.

8. The method as recited in claim 7, wherein if the codes match tuning the frequency tuned radio receiver of the monitoring system to the appropriate working voice channel and monitoring the resultant radio communications traffic.

9. A system for monitoring analog voice communications traffic in a truncked radio communications system, including:
a computational device with input and output devices and a sound card, said computational device capable of reading stored executable code; said stored executable code including:
a code segment instructing devices of the monitoring system to be configured to set both an appropriate data and sampling rate, wherein the sampling rate is set to a level at which is higher than the data rate;
a code segment instructing said computational device to receive a plurality of digital data messages on a control channel transmitted from at least one trunking radio system wherein each digital data message includes a preamble and a coded information frame;
a code segment for identifying the polarity of the incoming digital data messages;
a code segment instructing said computational device to sample the received digital message at the sample rate;
a calculating code segment instructing said computational device to calculate a plurality of parameters and values based on the data characteristics that allows a decoding element of the monitoring system to be suitably received and reconstruct the coded information frame for the apposite radio system and at the appropriate data rate, said calculating code segment including:
instructions for calculating the required values and parameters of the bit phase compensation table;
instructions for generating a subset of the preamble message;
instructions for calculating the preamble test value that allows the correlator array to establish the type of radio system and speed at which the radio system is transmitting its digital message;
instructions for computing the inverse preamble test value used for the data messages of those radio systems that are found inverted radio system,
instructions for generating a plurality of correlator mask values that are calculated for each test value that the correlator array uses to select the data bits in the preamble to compared;
instructions for determining an appropriate preamble alignment interval;
instructions for selecting an appropriate set of parameters and values based upon the system type identified;
instructions for reconstructing the stream of digital messages by selecting samples from the sample data stream to produce an output data stream.

10. The system recited in claim 9, wherein said code includes instructions if the polarity of the data stream of an incoming digital data message is negative, inverting the polarity of that data stream to be positive.

11. The system as recited in claim 9, wherein said code includes instructions searching a selected frequency band to discover a logical channel to frequency associations.

12. The system as recited in claim 11, where said code includes instructions to select a sample rate high enough so as to generate a bit phase compensator table built to encompass all required incoming bits.

13. The system as recited in claim 9, wherein said code includes instructions to store the plurality of parameters and values in at least one lookup table.

14. The system as recited in claim 9, wherein said code includes instructions for extracting the codes that specify the talk group and channel assignment from the reconstructed coded information frame.

15. The system as recited in claim 9, wherein said code includes for comparing the talk group and channel assignment codes to an array of stored, predefined codes.

16. The system as recited in claim 15, wherein said code includes instructions for configuring to tune the frequency tuned radio receiver of the monitoring system to the appropriate working voice channel and monitoring the resultant radio communications traffic, if the codes match.

17. The system as recited in claim 9, wherein said sampling rate is linearly related to a sampling rate of said sound card.

18. A system for monitoring communications in a trunked communication system comprising of: circuitry of a monitoring system configured to a computer readable program code devices of the monitoring system configured to set both an appropriate data and sampling rate, wherein the sampling rate is set higher than the data rate is a linear function of a sampling rate of a sound card; circuitry of a monitoring system configured to a computer readable program code devices of the monitoring system configured to receive a plurality of digital data messages on a control channel transmitted from at least one trunking radio system wherein each digital data message includes a preamble and a coded information frame; circuitry of a monitoring system configured to a computer readable program code devices of the monitoring system configured to identify the polarity of the incoming digital data messages; circuitry of a monitoring system configured to a computer readable program code devices of the monitoring system configured to sample the received digital message at the sample rate; circuitry of a monitoring system configured to a computer readable program code devices of the monitoring system configured to calculate a plurality of parameters and values based on the data characteristics that allows a decoding element of the monitoring system to be suitably receive and reconstruct the coded information frame for the apposite radio system and at the appropriate data rate further comprising the steps of; circuitry of a monitoring system configured to a computer readable program code devices of the monitoring system configured to calculate the required values and parameters of the bit phase compensation table; circuitry of a monitoring system configured to a computer readable program code devices of the monitoring system configured to generate a subset of the preamble message; circuitry of a monitoring system configured to a computer readable program code devices of the monitoring system configured to calculate the preamble test value that allows the correlator array to establish the type of radio system and speed at which the radio system is transmitting its digital message; circuitry of a monitoring system configured to a computer readable program code devices of the monitoring system configured to compute the inverse preamble test value used for the data messages of those radio systems that are found inverted radio system; circuitry of a monitoring system configured to a computer readable program code devices of the monitoring system configured to generate a plurality of correlator mask values that are calculated for each test value that the correlator array uses to select the data bits in the preamble to compared; and circuitry of a monitoring system configured to a computer readable program code devices of the monitoring system configured to determine an appropriate preamble alignment interval; and circuitry of a monitoring system configured to a computer readable program code devices of the monitoring system configured to select an appropriate set of parameters and values based upon the system type identified; and circuitry of a monitoring system configured to a computer readable program code devices of the monitoring system configured to reconstruct the stream of digital messages by selecting samples from the sample data stream to produce an output data stream.

19. The apparatus as recited in claim 18, wherein if the polarity of the data stream of an incoming digital data message is negative, inverting the polarity of that data stream to be positive.

20. The apparatus as recited in claim 18, includes the step of searching a selected frequency band to discover a logical channel to frequency associations.

21. The apparatus as recited in claim 18, wherein the circuitry of the monitoring system sets the selected sample rate high enough so as to generate a bit phase compensator table can be built that encompasses all required incoming bits.

22. The apparatus as recited in claim 18, wherein the circuitry of the monitoring system stores the plurality of parameters and values in at least one lookup table.

23. The apparatus as recited in claim 18, wherein the circuitry of the monitoring system extracts the codes that specify the talk group and channel assignment from the reconstructed coded information frame.

24. The apparatus as recited in claim 23, wherein the circuitry of the monitoring system compares the talk group and channel assignment codes to an array of stored, predefined codes.

25. The apparatus as recited in claim 24, wherein the circuitry of the monitoring system tunes the frequency tuned radio receiver of the monitoring system to the appropriate working voice channel and monitoring the resultant radio communications traffic, if the codes match.

* * * * *